Patented Apr. 24, 1928.

1,666,958

UNITED STATES PATENT OFFICE.

IVAR WALFRID CEDERBERG, OF STEGLITZ, NEAR BERLIN, GERMANY.

CATALYTIC COMBUSTION OF AMMONIA-OXYGEN MIXTURES.

No Drawing. Application filed December 8, 1924, Serial No. 754,655, and in Germany December 4, 1923.

The catalytic combustion of ammonia with pure oxygen or high-percentage mixtures of oxygen and air is connected, as is known, with great difficulties, as the very abundant evolution of heat occurring during the reaction causes overheating of the catalyst, whereby poor yields of nitric oxides are obtained, and moreover heavy explosions may occur of the initial mixture, which is explosive when it has a high ammonia content.

Now attempts have already been made to remove these difficulties in various ways, thus for example by means of special constructions of the apparatus, by cooling the gaseous mixture before admitting it to the reaction chamber, or by cooling the contact apparatus itself.

It has however been found that in industrial working the means hitherto employed for obviating over-heating of the catalyst do not succeed in producing, in the case of gaseous mixtures with a high ammonia content, an oxidation of the ammonia without loss. Now the invention consists in this, that the reaction mixture containing ammonia and oxygen is conducted over a catalyst at which all parts are directly enclosed by the apparatus walls and that by cooling the contact apparatus by means of a suitable cooling fluid, for instance water, a so high drop of temperature is created between the catalyst and the apparatus walls, that explosions are prevented. Under these reaction conditions the occurrence of flame combustion in the interior of the contact apparatus is not possible. On the other hand and surprisingly enough no cessation of the flameless catalytic combustion takes place in spite of the very intense cooling.

The process permits of a perfectly safe combustion of ammonia-oxygen mixtures with almost the theoretical yield of nitric oxides.

I claim:—

1. In the process of catalytically oxidizing ammonia to nitric oxides, the step which comprises passing a mixture of ammonia and oxygen over a catalyst heated to reaction temperature and maintained in a reaction zone, and cooling one face of the reaction zone whereby a high temperature gradient is formed between the catalyst and the cooled face.

2. In the process of oxidizing ammonia to nitric oxide, in a catalytic chamber containing a catalyst heated to reaction temperature, the step which comprises cooling the walls of said chamber so that a temperature gradient is effected between the heated catalyst and the walls of the container.

IVAR WALFRID CEDERBERG.